C. Wetzler.
Combination Tool.
N° 86,048.                    Patented Jan. 19, 1869.
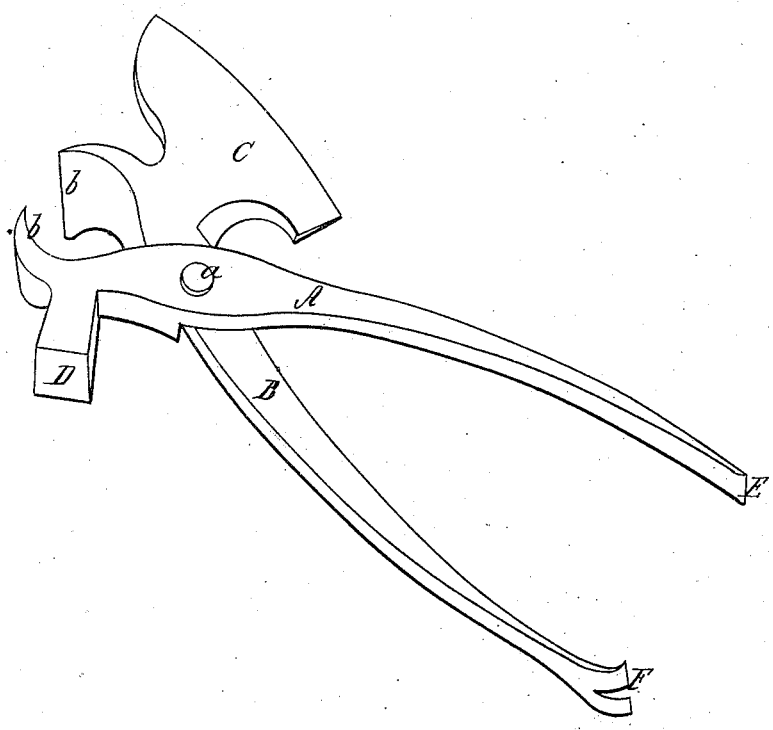
Witnesses;
J. T. Dodge.
L. Hailer.
Inventor;
Charles Wetzler
by Dodge & Munn
his attys

CHARLES WETZLER, OF CHICAGO, ILLINOIS.

Letters Patent No. 86,048, dated January 19, 1869.

IMPROVED IMPLEMENT.

The Schedule referred to in these Letters Patent and making part of the same.

*To all whom it may concern:*

Be it known that I, CHARLES WETZLER, of Chicago, in the county of Cook, and State of Illinois, have invented certain new and useful Improvements in Combination Tool; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a compound tool, of novel construction, in which are combined a hammer, hatchet, screw-driver, nail-extractor, and pair of pincers, all as hereinafter described.

In the drawings, my tool is shown in perspective.

The tool is constructed of an ordinary pair of pincers, of large size, having the rear ends of their arms formed, one into a screw-driver and the other into a claw for extracting nails, and the backs of the heads or jaws of the pincers made heavier than usual, and one of them shaped into a hatchet-blade, and the other into a hammer-head, all as clearly shown in the drawings.

A and B are the two arms or levers of the pincers, pivoted together at *a*, and formed with ordinary jaws *b*, as shown.

The rear end of the lever A is flattened, and formed into a screw-driver, and the end of lever B flattened and forked, thus forming a claw, F, with which to extract nails, &c.

On the back of one of the jaws *b* is formed a hatchet-blade C, and on the back of the opposite jaw, a hammer-head, D.

The tool, thus constructed, is strong, cheap, and simple, and answers perfectly the purposes of five distinct and separate instruments, as ordinarily made, and consists of but three pieces, the two levers, A and B, and the pivot *a*.

Having thus described my invention,

What I claim, is—

The implement, consisting of the handles A B, pivoted together in the form of pincers, and provided with the jaws *b*, hammer-head D, hatchet C, screw-driver E, and claw F, all constructed and arranged substantially as described.

CHARLES WETZLER.

Witnesses:
WM. H. LOTZ,
J. W. BOPE.